(12) United States Patent
Wilcox et al.

(10) Patent No.: US 7,231,693 B2
(45) Date of Patent: Jun. 19, 2007

(54) STRAP-TENSIONING DEVICE WITH TENSION INDICATOR

(75) Inventors: Michael Wilcox, Woodbridge, CA (US); Raymond S. Brown, Modesto, CA (US)

(73) Assignee: USA Products Group, Inc., Lodi, CA (US)

( * ) Notice: Subject to any disclaimer, the term of this patent is extended or adjusted under 35 U.S.C. 154(b) by 46 days.

(21) Appl. No.: 10/873,864

(22) Filed: Jun. 22, 2004

(65) Prior Publication Data

US 2005/0278902 A1 Dec. 22, 2005

(51) Int. Cl.
*B25B 25/00* (2006.01)
(52) U.S. Cl. ............. 24/68 R; 24/68 CD; 254/213
(58) Field of Classification Search ............ 24/68 CD
See application file for complete search history.

(56) References Cited

U.S. PATENT DOCUMENTS

| | | | | |
|---|---|---|---|---|
| 942,006 | A * | 11/1909 | Morehead | .............. 254/223 |
| 2,998,626 | A | 9/1961 | Prete, Jr. | |
| 3,119,278 | A | 1/1964 | Simpson | |
| 4,185,360 | A * | 1/1980 | Prete et al. | ............ 24/68 CD |
| 4,510,651 | A | 4/1985 | Prete, Jr. et al. | |
| 4,567,628 | A | 2/1986 | Prete, Jr. et al. | |
| 4,622,721 | A * | 11/1986 | Smetz et al. | ........... 24/68 CD |
| 4,912,813 | A * | 4/1990 | Muller et al. | ........... 24/68 CD |
| 4,951,365 | A * | 8/1990 | Loyd | ................ 24/68 CD |
| 5,282,296 | A * | 2/1994 | Huang | ................ 24/68 CD |
| 5,524,505 | A | 6/1996 | Lawrence | |
| 5,549,429 | A | 8/1996 | Sergent | |
| 5,727,940 | A * | 3/1998 | Wanzenbock | ................ 433/5 |
| 6,158,092 | A * | 12/2000 | Huang | ................ 24/68 CD |
| 6,195,848 | B1 * | 3/2001 | Jackson et al. | ......... 24/68 CD |
| 6,196,092 | B1 | 3/2001 | Potter | |
| 2004/0104380 | A1 * | 6/2004 | Huang | ................ 254/218 |
| 2005/0177984 | A1 * | 8/2005 | Huang | ................ 24/68 CD |

FOREIGN PATENT DOCUMENTS

| | | | |
|---|---|---|---|
| DE | 3248789 A1 * | 7/1984 | |
| GB | 2108616 | * | 5/1983 |

* cited by examiner

Primary Examiner—Robert J. Sandy
(74) Attorney, Agent, or Firm—MacPherson Kwok Chen & Heid LLP

(57) ABSTRACT

A strap tensioning device for anchoring a load to an anchor point, that includes a strap, a base member having a pair of arms, a handle rotatably connected to the base member, a mechanism operated by rotation of the handle for securing the strap to the base member under a tension, an anchor for anchoring the base member to the anchor point, and a tension indicating device connected to the base member. The tension indicating device includes a load member extending between the arms, and preferably a spring connected between the load member and the base member. At least one of the anchor and the strap are configured to exert a changing force on the load member for moving the load member against a resilient force of the spring as the tension in the strap changes.

61 Claims, 10 Drawing Sheets

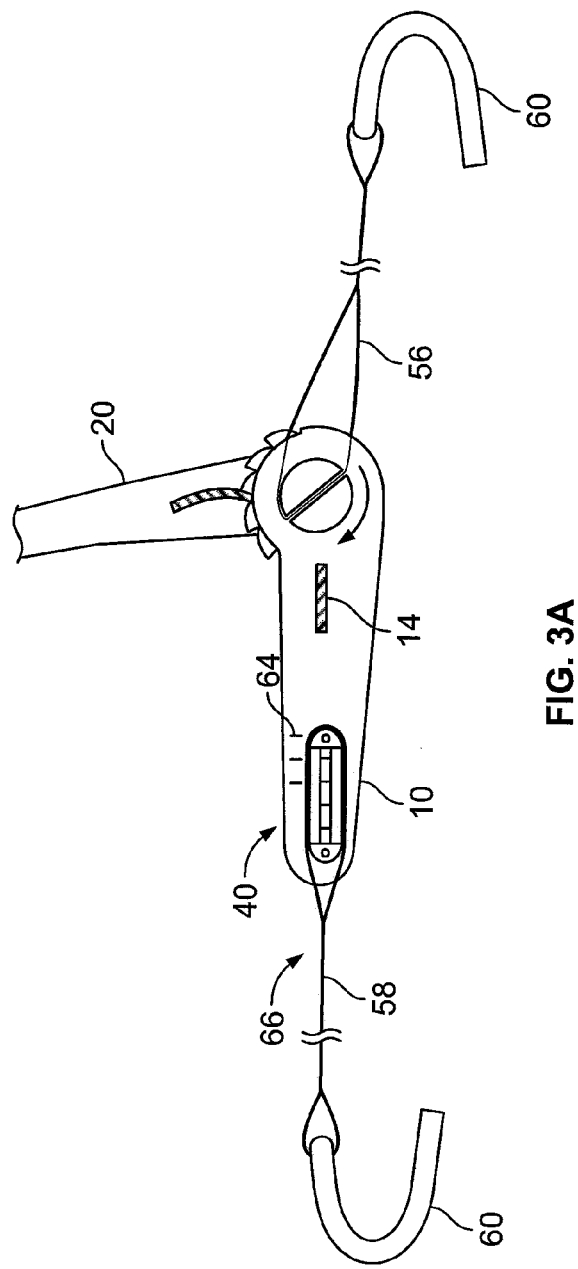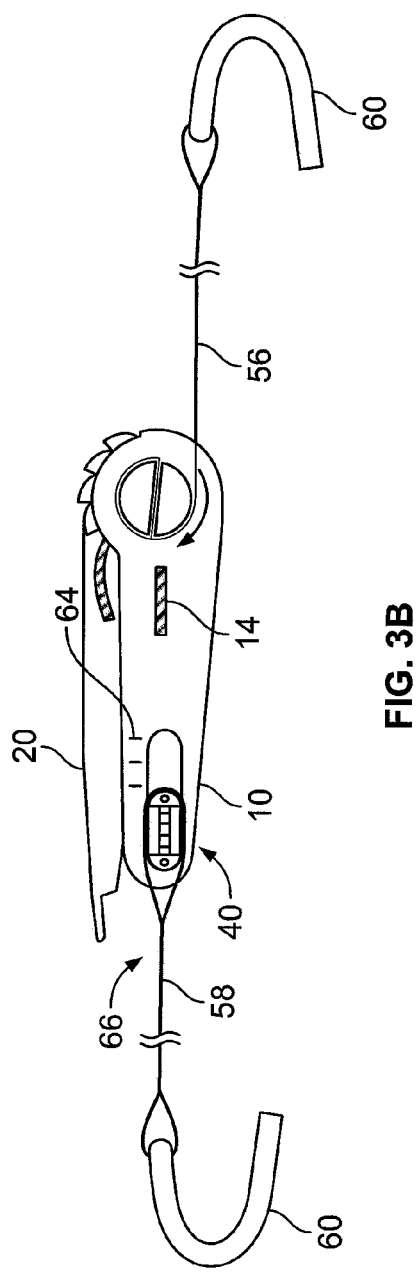
FIG. 3A
FIG. 3B

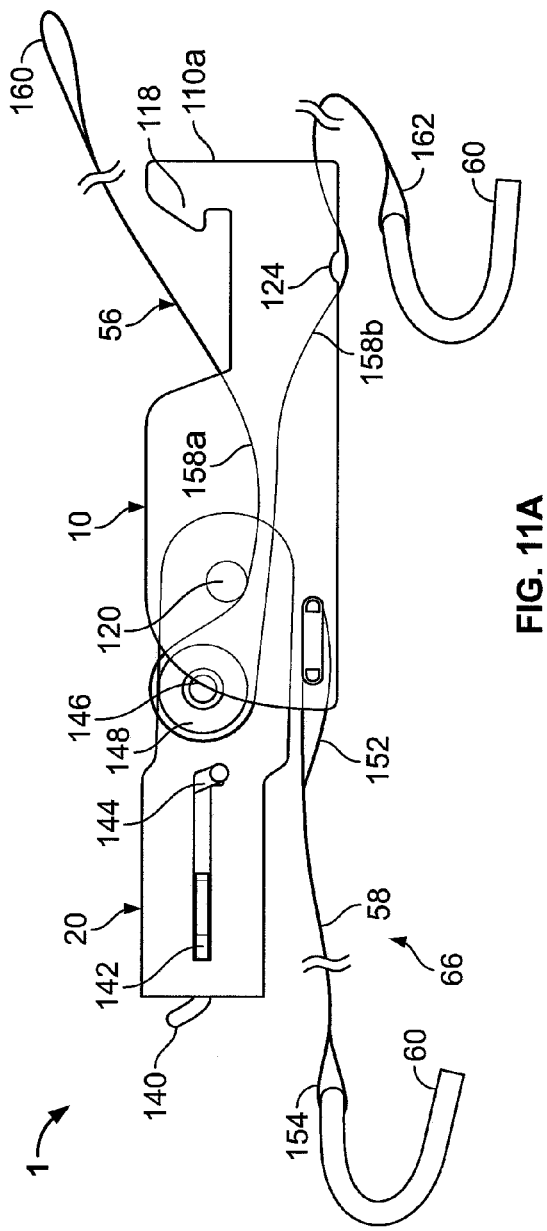
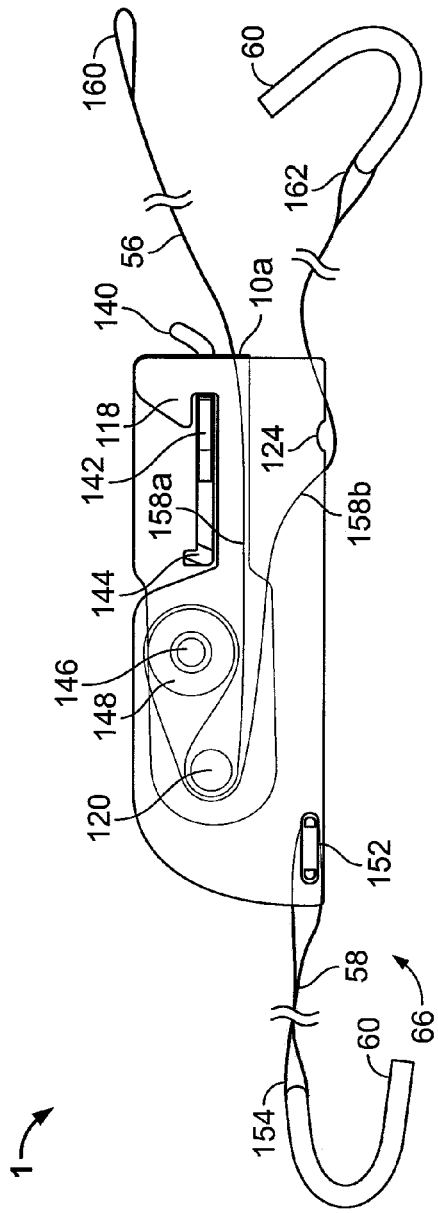
FIG. 11A
FIG. 11B

STRAP-TENSIONING DEVICE WITH TENSION INDICATOR

FIELD OF THE INVENTION

The present invention relates to strap tensioning devices used to secure loads, and more particularly to strap tension devices that include means for measuring the tension that the strap tensioning devices place on the strap(s).

BACKGROUND OF THE INVENTION

Ratchet-type strap tensioning devices are well known for winding up tensioning straps and securing the straps in a tensioned condition to secure loads for hauling or transport. Examples of such devices are disclosed in U.S. Pat. Nos. 4,185,360, 5,282,296, 6,158,092, and 6,195,848, which are incorporated herein by reference. Ratchet-type strap tensioning devices generally include a frame or base member and a lever arm which is moved relative to the frame to drive a ratchet mechanism that rotates a slotted reel through which the tensioning strap is threaded, thus advancing the strap into a tensioned condition. Typical ratchet-type strap tensioning devices have one end of the frame secured in a fixed relationship to an anchor point, for example, by means of a short piece of strap attached at one end of the frame with the other end of the strap fixed to a hook that is secured to the anchor point. A second hook fixed to a longer length of tensioning strap is then secured to a second anchor point and the longer strap is threaded through a slotted reel on the tensioning device. Rotation of the reel by means of the ratchet mechanism winds the strap into a tensioned condition and secures the load.

A disadvantage of conventional ratchet-type strap tensioning devices is that it can be difficult to place the proper tension on the straps (and thus on the load and anchor points). If the tension is too low, the load is not properly secured. If the tension is too great, the straps, the load, the anchor points and even the tensioning device itself can be damaged.

SUMMARY OF THE INVENTION

The present invention solves the aforementioned problems by providing a tensioning device integral with a tension indicator, to ensure the strap tension is not too small or excessive.

The tensioning device of the present invention, for anchoring a load to an anchor point, includes a strap, a base member, a mechanism for securing the strap to the base member under a tension, an anchor for anchoring the base member to the anchor point, and the base member includes a tension indicating device having a load member that moves in response to changes in the tension.

In another aspect of the present invention, the tensioning device of the present invention includes a strap, a base member having a pair of arms, a handle rotatably connected to the base member, a mechanism operated by rotation of the handle for securing the strap to the base member under a tension, an anchor for anchoring the base member to the anchor point, and a tension indicating device connected to the base member. The tension indicating device includes a load member extending between the arms, and a spring connected between the load member and the base member, wherein at least one of the anchor and the strap are configured to exert a changing force on the load member for moving the load member against a resilient force of the spring as the tension changes.

Other objects and features of the present invention will become apparent by a review of the specification, claims and appended figures.

BRIEF DESCRIPTION OF THE DRAWINGS

FIG. 3A is a side view of the tensioning device of the present invention, while in a low strap tension state.

FIG. 3B is a side view of the tensioning device of the present invention, while in a high strap tension state.

FIG. 11A is a side view of the alternate embodiment of the tensioning device (shown in its open position) of the present invention, illustrating the strap path.

FIG. 11B is a side view of the alternate embodiment of the tensioning device (shown in its closed position) of the present invention, illustrating the strap path.

DETAILED DESCRIPTION OF THE PREFERRED EMBODIMENTS

The present invention is a strap tensioning device that includes a tension indicator for visually indicating the amount of tension placed upon the straps (and thus onto the anchor points, the load, and even the strap tensioning device itself).

Figure 1:
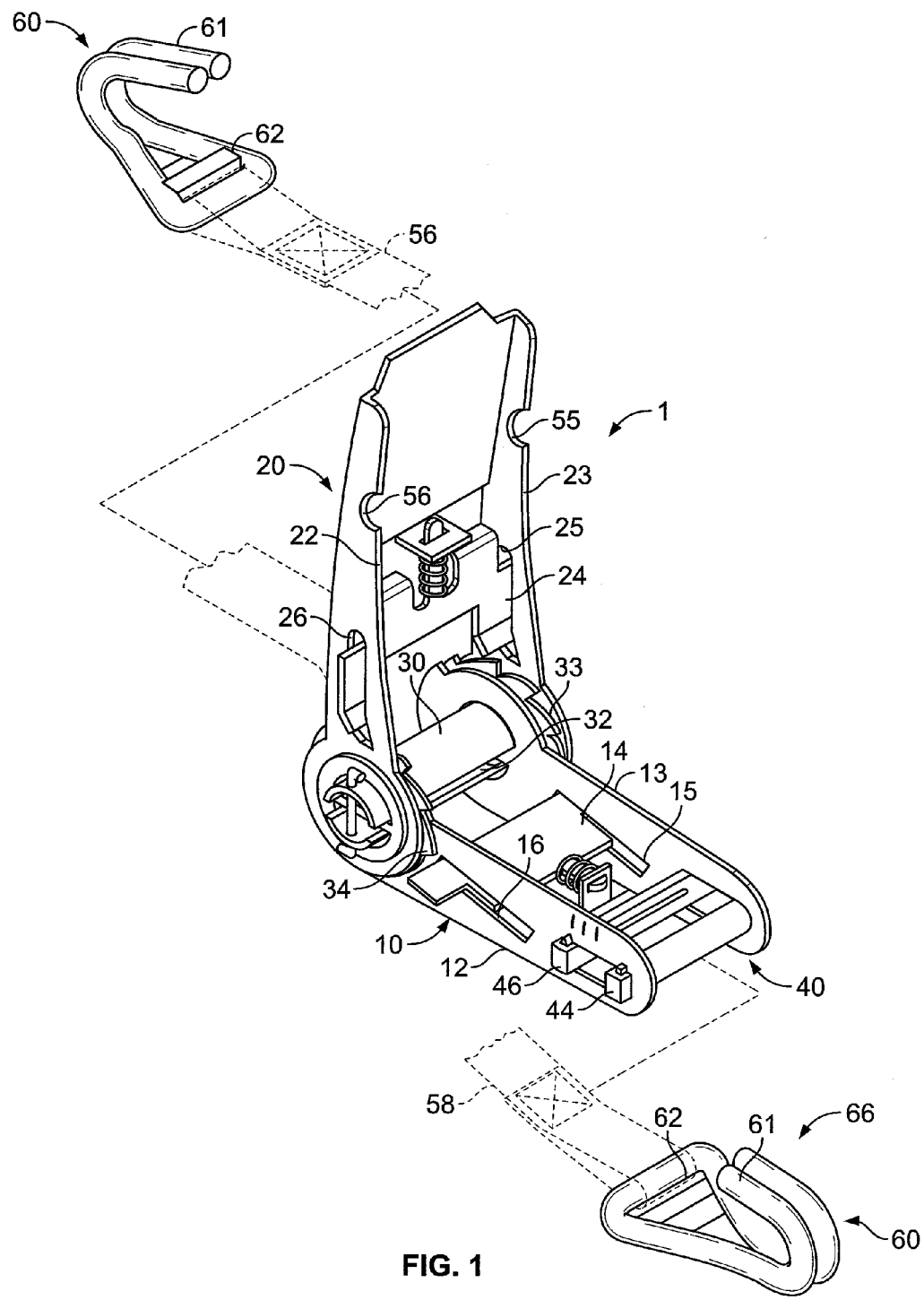
FIG. 1 is a perspective view of the tensioning device of the present invention.
Figure 2A:
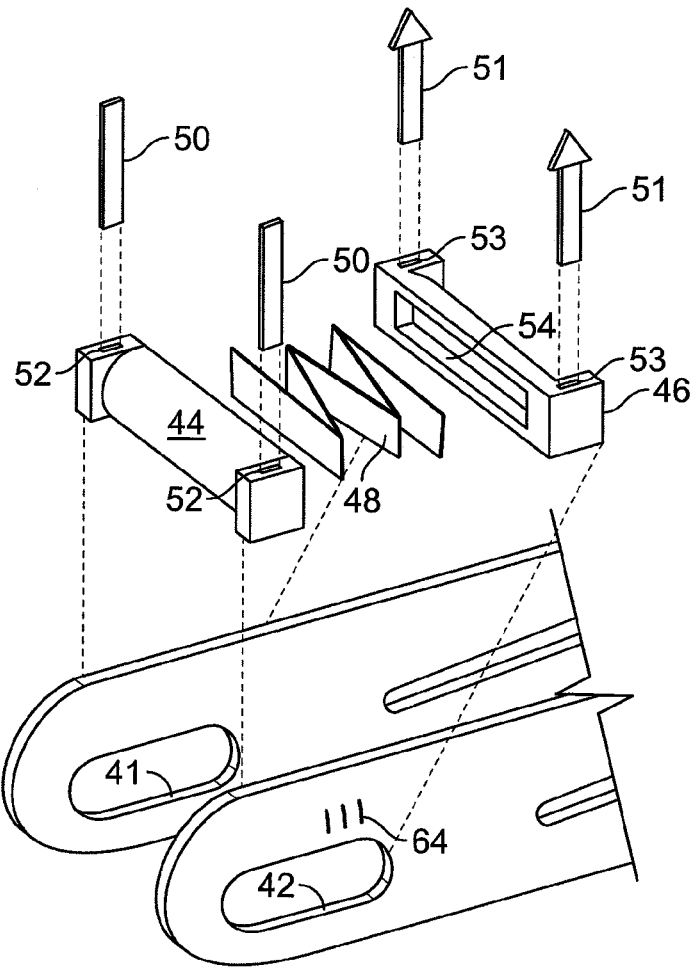
FIG. 2A is an exploded perspective view of the tension indicating device of the present invention
Figure 2B:
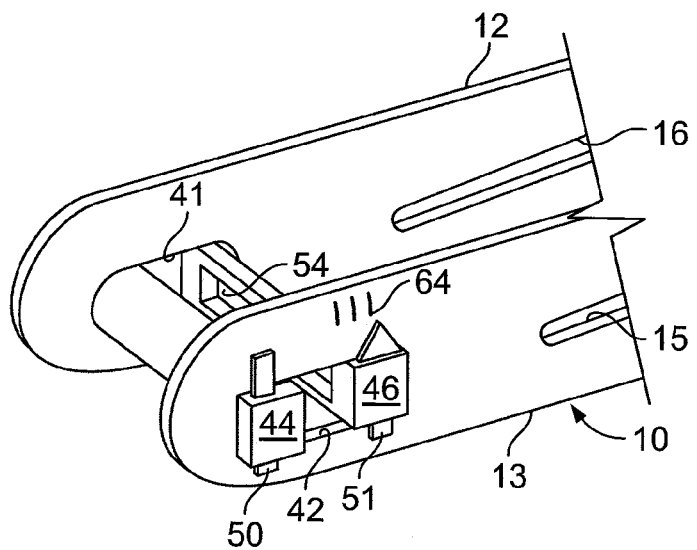
FIG. 2B is a perspective view of the tension indicating device of the present invention.

A strap tensioning device 1 according to the present invention is depicted in FIGS. 1, 2A and 2B. The device 1 includes a base member 10 having opposed parallel arms 12 and 13. Cylindrical reel member 30 is rotatably mounted on the base member between arms 12 and 13. The reel member 30 includes reel slot 32 for receiving a first tensioning strap 56. The reel member 30 is preferably formed of two hemi-cylindrical pieces having planar surfaces facing one another in a spaced apart relationship that define the reel slot 32. Ratchet wheels 33 and 34 are mounted on the reel member 30 in a fixed position relative to the reel member 30 with base member arms 12 and 13 positioned between ratchet wheels 33 and 34. Locking plate 14 is slidably mounted between arms 12/13 and in slots 15 and 16 for engagement with ratchet wheels 33 and 34. The locking plate 14 is urged toward the ratchet wheels 33/34 by resilient means such as a spring coil attached between the plate 14 and the base member 10.

Handle member 20 includes opposed parallel arms 22 and 23 rotatably mounted on reel member 30 with the ratchet wheels 33 and 34 and base member arms 12 and 13 between the handle member arms 22 and 23. Pawl 24 is slidably mounted between arms 22/23 and in slots 25 and 26 for engagement with the ratchet wheels. The pawl 24 is likewise urged toward the ratchet wheels 33/34 by resilient means such as a spring coil attached between the pawl 24 and the handle member 20. In the preferred embodiment, the reel member 30 and ratchet wheels 33 and 34 are assembled and mounted onto the base and handle arms according to the ways disclosed in U.S. Pat. No. 5,282,296 to Huang, which is incorporated herein by reference.

A tension indicator device 40 is mounted between base member arms 12 and 13, in slots 41 and 42 formed near the opposite end of the arms 12/13 from the mounted reel member 30. The tension indicator device 40 includes a reference member (pin) 44, a load member (pin) 46 and a spring 48. Reference pin 44 extends through and abuts the far ends of slots 41/42, and is held in place by a pair of locking pins 50 that insert through locking holes 52 at the ends of reference pin 44. Similarly, load pin 46 extends through and initially abuts the near ends of slots 41/42, and is held in place by a pair of locking pins 51 that insert through locking holes 53 at the ends of load pin 46. Spring 48 is disposed between and pushes against pins 44/46 (away from each other), and preferably is held in place by spring cavities 54 formed in pins 44/46.

In operation, a first tensioning strap 56 (preferably but not necessarily having a hook member 60 attached at one end) is threaded through reel slot 32, as illustrated in FIG. 3A. A second tensioning strap 58 (also preferably but not necessarily having a hook member 60 attached at one end) is looped around the tension indicator device, and more particularly looped around load pin 46. Hook members 60 each include a hook portion 61 for engaging with anchor points, and an eye 62 through which one of the tensioning straps 56/58 is threaded. Thus, strap 58 and optional hook 60 attached thereto form an anchor 66 for securing base member 10 to an anchor point as tension on strap 56 (and therefore on anchor 66) is created and/or maintained. In most cases, the tension on strap 58 will be equal to, or at least proportional to, the tension on strap 56.

With no tension on the straps 56/58, the load pin 46 is positioned at one end of slots 41/42 (away from reference pin 44), as shown in FIG. 3A. After the hook members 60 are affixed to anchor points, and straps 56/58 are positioned around the load to be secured, movement of handle member 20 away from base member 10 drives the reel member 30 (via pawl 24 and the ratchet wheels 33 and 34), causing the first tension strap 56 to wind around the reel member 30, as shown in FIG. 3B. Locking plate 14 prevents reel member 30 from rotating in a reverse direction, so that handle member 20 can repeatedly be moved toward and away from base member 10 to further wind first strap 56 around reel member 30. The winding of first strap 56 shortens its overall effective length, thus imparting a tension to the straps 56/58.

The tension indicator device operates by load pin 46 moving along slots 25/26 in proportion to any change in the amount of tension on strap 58. Specifically, as the tension on straps 56/58 increases and second strap 58 pulls on load pin 46 with greater force, load pin 46 moves (slides) toward reference pin 44 against the resilient force of spring 48, as shown in FIG. 3B. The greater the tension on second strap 58, the more spring 48 compresses and the more load pin 46 slides toward reference pin 44, thus giving a visual indication of the amount of the tension that is placed onto straps 56/58 by tensioning device 1 (or even by a shift in the load after tensioning has been completed). Indicia 64, such as line markings, can be printed or formed on base member 10 adjacent slots 41/42 to quantitatively indicate the amount of tension on straps 56/58. Locking pins 51 could be specially shaped, such as with an arrow shape at their upper ends, to align with or point to indicia 64. Indicia 64 could be any visual indicator of the position, such as color markings, an inclined line or triangle, a bar graph, etc., that quantitatively shows the sliding position of locking pins 51 and/or load pin 46 along the lengths of slots 41/42. Sliding locking plate 14 away from reel member 30 disengages plate 14 from ratchet wheels 33/34, thus allowing reel member 30 to rotate in a reverse direction and release the tension on straps 56/58.

The tension indicator 40 is useful in ensuring that the proper tension is imparted on the straps for any given application. Some loads require a lighter tension to prevent damage to fragile loads or weaker anchor points, and thus the tensioning device 1 can be operated until the load pin 46 moves to just the first indicia mark 64. Other loads require greater tension to properly secure them in place, and thus the tensioning device 1 can be operated until the load pin 46 moves to indicia mark 64 corresponding to the desired tension. By integrally including tension indicator 40 with the tensioning device 1, loads are properly secured with sufficient tension while avoiding excessive tension that can damage the straps 56/58, the load being secured, and anchor points to which the hooks 60 are attached, and even the tensioning device 1 itself.

Figure 4:
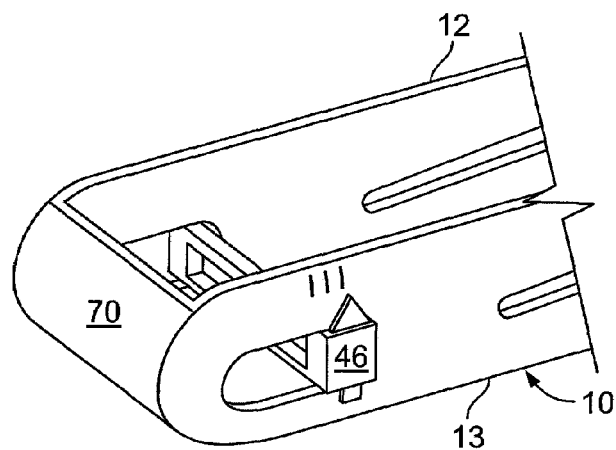
FIG. 4 is a perspective view of a first alternate embodiment of the tension indicating device of the present invention.

It should be understood that tension indicator device 40 can be implemented in tensioning device 1 in many different ways. For example, spring 48 can be made of any resilient or flexing material, such as one or more coil springs, a block of compressible material such as rubber, etc., that exerts a resilient force on load pin 46 to counteract the tension of strap 58, so that load pin 46 moves in proportion to the strap tension. Reference pin 44 could be any rigid member, block of material or even an end wall of base member 10 that provides a reference surface fixed relative to the base member 10 against which spring 48 is attached or abuts, for providing movement of the load pin relative to tensioning device 1 in proportion to the strap tension. For example, FIG. 4 illustrates an alternate embodiment of tension indicator device 40, where spring 48 (not shown) extends between load pin 46 and an end wall 70 of base member 10 (where the second strap extends around the end wall 70, or through one or more slots (not shown) formed in the end wall 70).

Figure 5A:
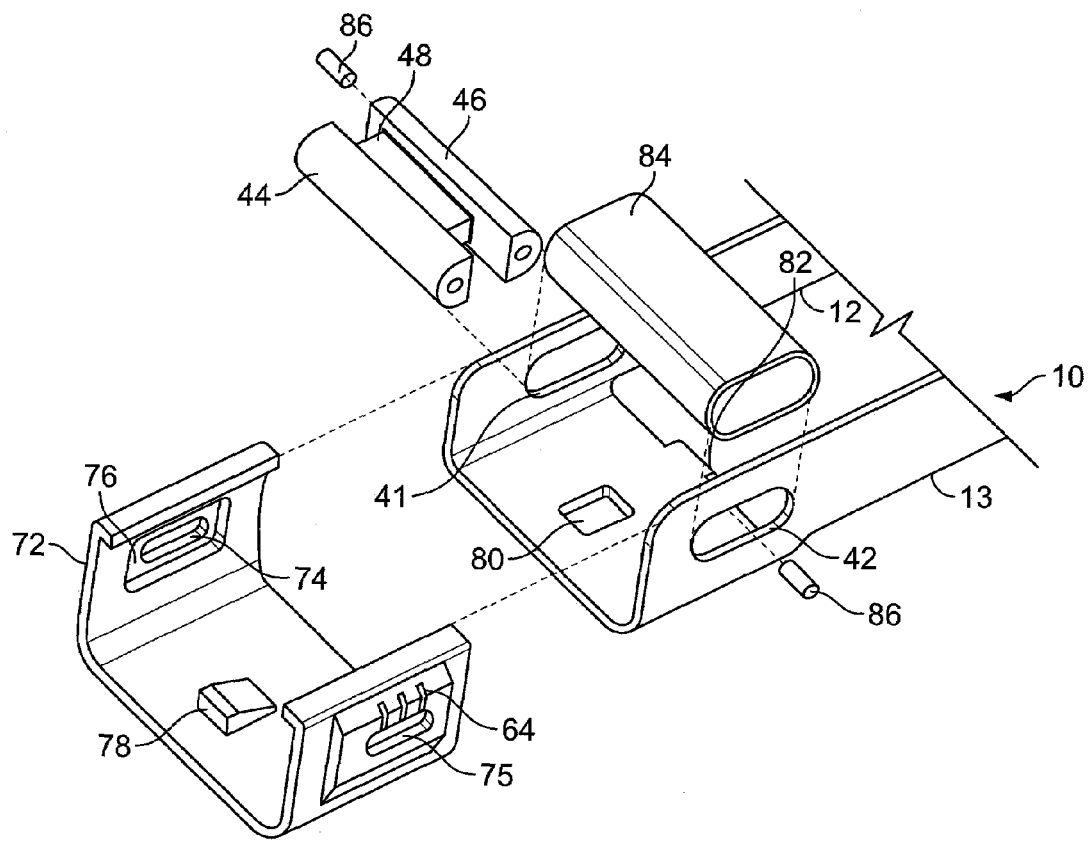
FIG. 5A is an exploded perspective view of a second alternate embodiment of the tension indicating device of the present invention.
Figure 5B:
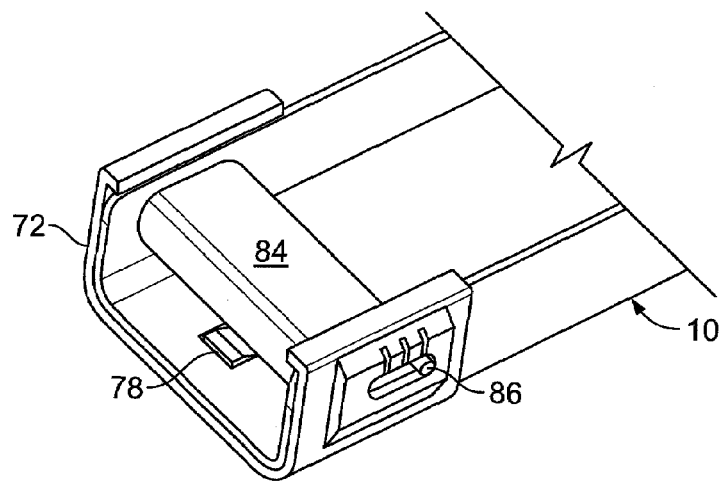
FIG. 5B is a perspective view of the second alternate embodiment of the tension indicating device of the present invention.

FIGS. 5A and 5B illustrate a second alternate embodiment of tension indicator device 40, where an external sleeve 72 having matching slots 74/75, containment recesses 76, and a locking tab 78 slides over the ends of arms 12/13 until locking tab 78 engages a locking hole 80 formed in a bottom wall 82 extending between the arms 12/13. Reference/load pins 44/46 are contained within a pin sleeve 84, and spring 48 is a block of compressible material such as rubber disposed between the pints 44/46. Pins 44/46 are contained within recesses 76, which hold reference pin 44 in place during spring compression. Pin sleeve 84 keeps reference/load pins 44/46 in proper alignment, and provides a smooth surface around which strap 58 can be looped. Indicator pins 86 extend from load pin 46 and through slots 74/75 and 41/42, to indicate a relative position of load pin 46 as spring 48 is compressed.

Figure 6A:
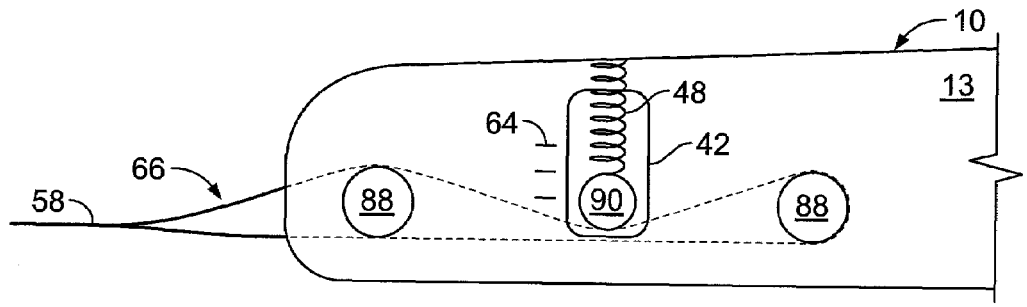
FIG. 6A is a side view of a third alternate embodiment of the tension indicating device of the present invention, while in a low strap tension state.
Figure 6B:
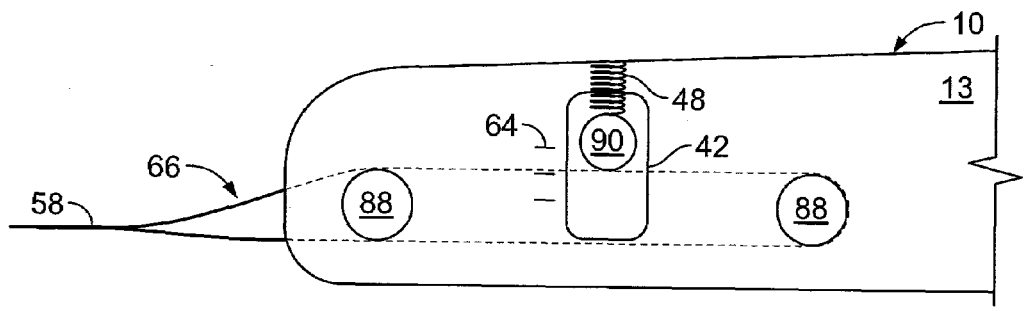
FIG. 6B is a side view of the third alternate embodiment of the tension indicating device of the present invention, while in a high strap tension state.

FIGS. 6A and 6B illustrate a third alternate embodiment of the tension indicator device 40, which includes a pair of fixed pins 88 extending between arms 12/13. A spring loaded load member (pin) 90 is resiliently disposed between pins 88, where strap 58 is fed over pins 88 and under pin 90. When tension increases on strap 58, it presses load pin 90 upwardly against the resilient force of spring 48. The position of pin 90 along the length of slots 41/42 indicates the amount of tension on strap 58. This configuration can easily be implemented on either first or second straps 56/58. It should be noted that, contrary to the previous embodiments where the movement of the load pin 46 was generally parallel to the tension force of strap 58, the load pin 90 of the third alternate embodiment moves in a direction generally perpendicular to the tension force of the strap 58.

Figure 7A:
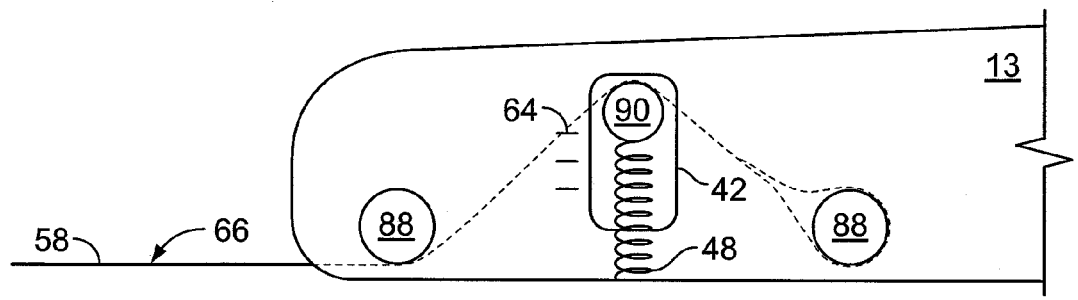
FIG. 7A is a side view of a fourth alternate embodiment of the tension indicating device of the present invention, while in a low strap tension state.
Figure 7B:
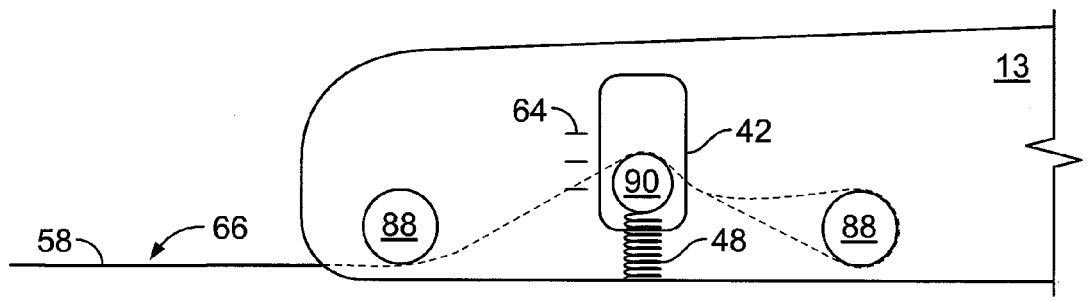
FIG. 7B is a side view of the fourth alternate embodiment of the tension indicating device of the present invention, while in a high strap tension state.
Figure 7C:
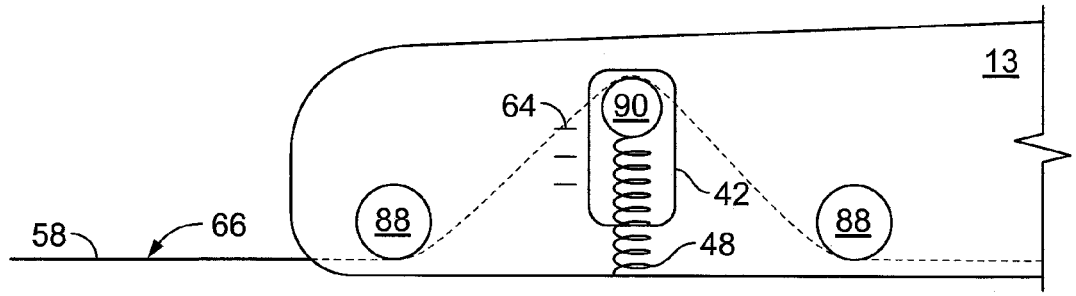
FIG. 7C is a side view of the fourth alternate embodiment of the tension indicating device of the present invention, with the strap extending beyond the tension indicating device.

FIGS. 7A and 7B illustrate a fourth alternate embodiment of the tension indicator device 40, which is similar to the third alternate embodiment, except the strap 58 exerts a downward force on load pin 90. FIG. 7C illustrates how this embodiment can be used on a strap 58 that extends into the tensioning device 1 beyond the tension indicator device 40 (such as for the single strap ratchet tensioning device of U.S. Pat. No. 6,195,848, which is incorporated herein by reference), where, for example, straps 56/58 are connected (e.g. are different portions of a single integral strap). Accordingly, the anchor and the strap are integrally formed together as a single strap passing through the base member.

Figure 8A:
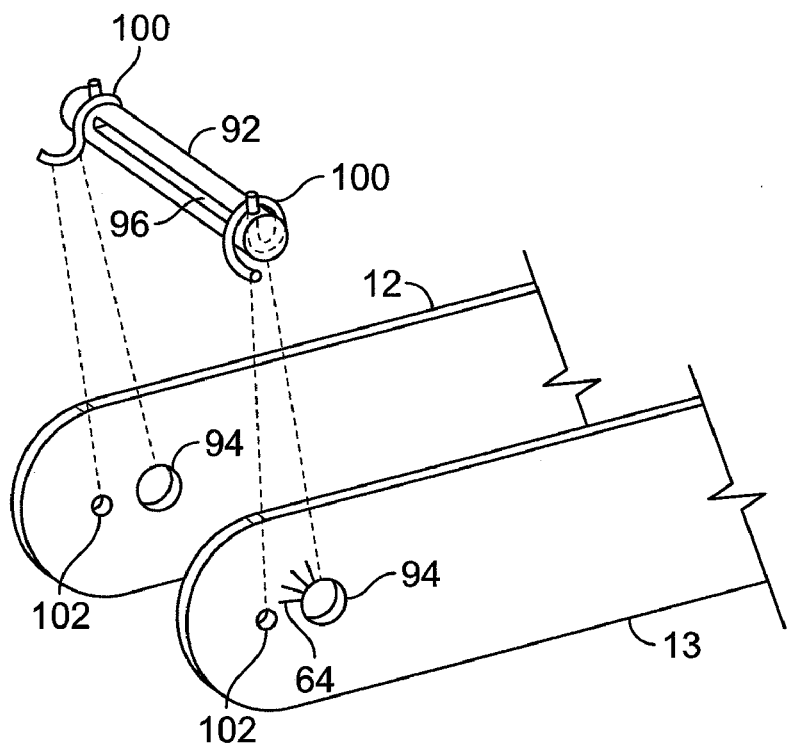
FIG. 8A is an exploded perspective view of a fifth alternate embodiment of the tension indicating device of the present invention.
Figure 8B:
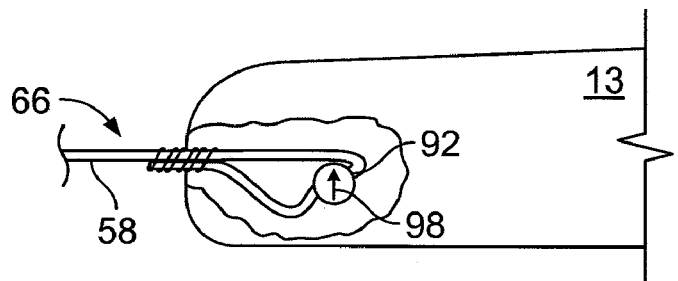
FIG. 8B is a partially broken away side view of the fifth alternate embodiment of the tension indicating device of the present invention, while in a low strap tension state.
Figure 8C:
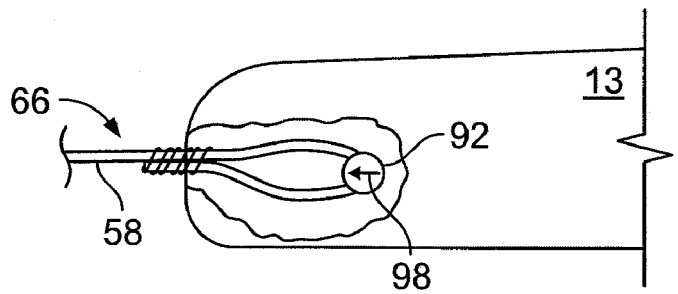
FIG. 8C is a partially broken away side view of the fifth alternate embodiment of the tension indicating device of the present invention, while in a high strap tension state.

In the above described embodiments, the movement of load pins 46/90 in response to changes in strap tension is translational. However, such movement could alternately (or additionally) be rotational. FIGS. 8A to 8C illustrate a fifth alternate embodiment where the load member (pin) 92 is rotationally mounted in a pair of holes 94 formed in the arms 12/13. The load pin 92 includes a through slot 96 in which the strap 58 extends and is fixedly held. An arrow or other indicia 98 is preferably included on the ends of load pin 92 to indicate the rotational position of load pin 92 by pointing to the indicia 64 on arms 12/13. One or more springs 100 are fixed between the load pin 92 (e.g. first end extending through transverse holes in pin 92) and arms 12/13 (e.g. second end extending through holes 102). Spring(s) 100 urge the pin 92 to partially wind strap 58 there-around, as illustrated in FIG. 8B. As strap tension increases, load pin 90 moves (rotates) against the resilient force of spring(s) 100, thus indicating the increased amount of tension on strap 58 by its changed rotational position (as shown in FIG. 8C).

Figure 9:
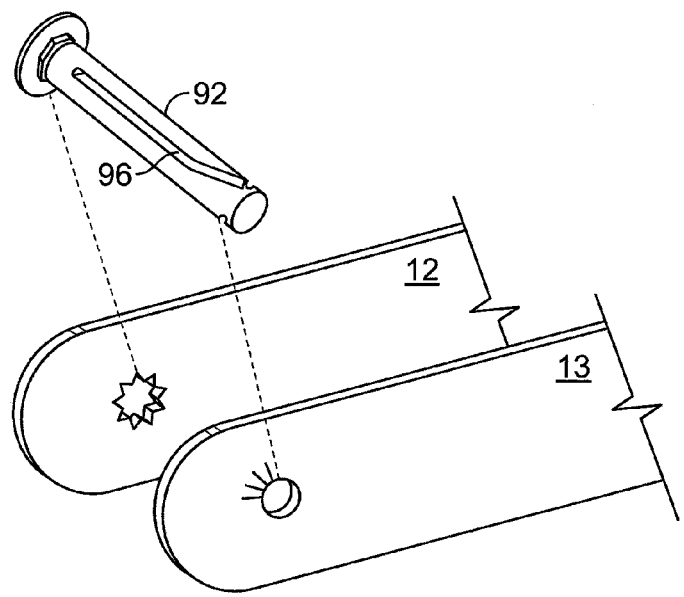
FIG. 9 is an exploded perspective view of a sixth alternate embodiment of the tension indicating device of the present invention.

FIG. 9 illustrates a sixth alternate embodiment, where the first end of the load pin 92 is held fixed both rotationally and translationally, and the second end is fixed just translationally. The slot 96 is curved near the second end, so that as tension of the strap through slot 96 is increased, the pin second end rotationally twists (flexes) in proportion to the amount of strap tension. Accordingly, the movement of the load member includes torsional flexing of one end of the load member.

Figure 10A:
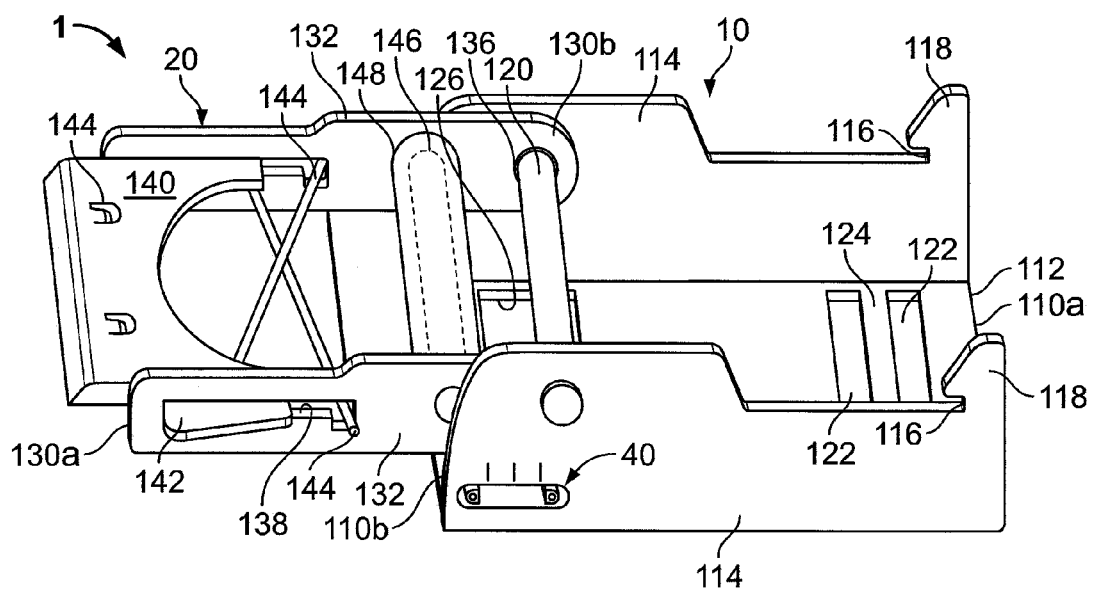
FIG. 10A is a perspective view of an alternate embodiment of the tensioning device (shown in its open position) incorporating the tension indicating device of the present invention.
Figure 10B:
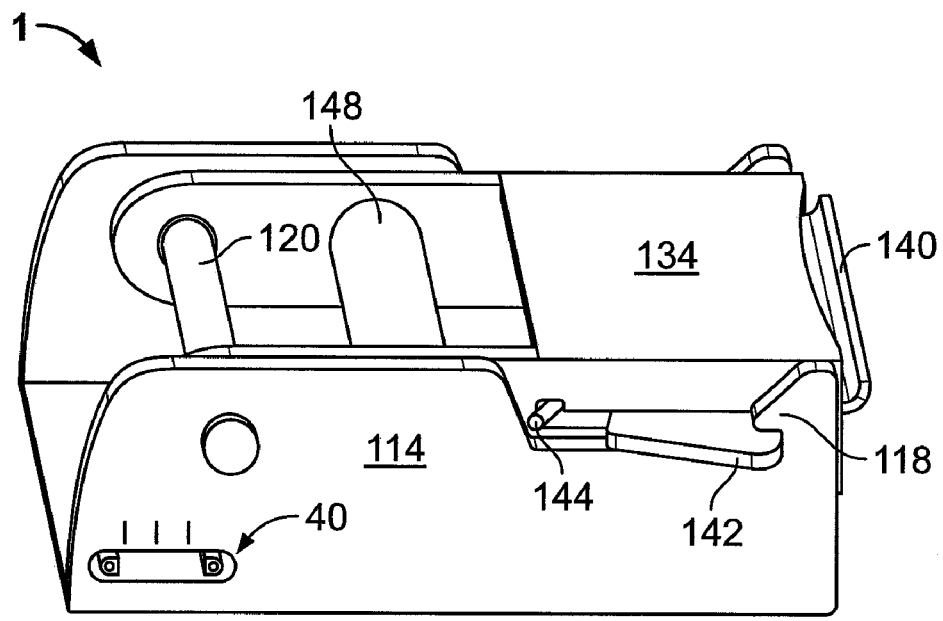
FIG. 10B is a perspective view of the alternate embodiment of the tensioning device (shown in its closed position) incorporating the tension indicating device of the present invention.
Figure 10C:
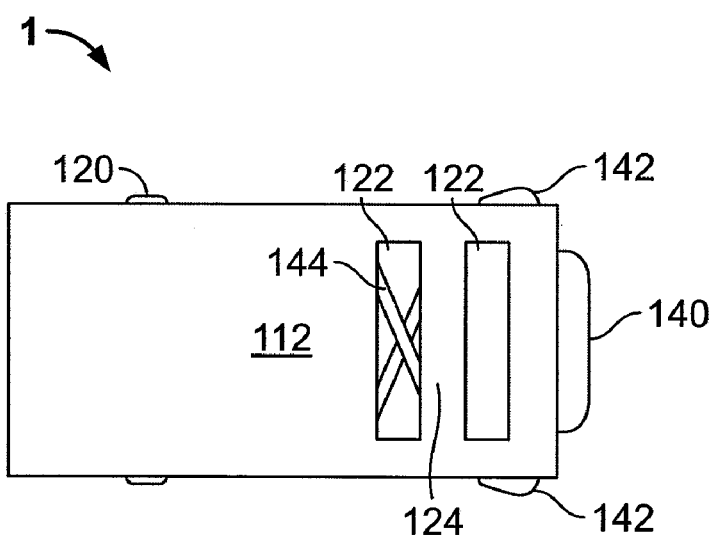
FIG. 10C is a bottom view of the alternate embodiment of the tensioning device of the present invention.

FIGS. 10A to 10C illustrates a seventh alternate embodiment of the present invention, where the tension indicator device 40 is included in a tensioning device that does not include a ratchet-type assembly for increasing strap tension. In this embodiment, the base member 10 includes a base plate 112 with two opposing sidewalls 114 extending therefrom. Notches 116 creating engagement hooks 118 are formed in the sidewalls 114 near a distal end 110*a* of base member 10. A first bolt 120 is connected between the sidewalls 114 near a proximate end 110*b* of base member 10. Any conventional attachment scheme (e.g. rivet, bolt head, welding, etc.) can be used to secure bolt 120 to sidewalls 114. A pair of strap openings 122 are formed in base plate 112 near base member distal end 110*a*, leaving a beam 124 formed therebetween. One of the tension indicator device 40 embodiments described above (e.g. device 40 as shown and described with respect to FIGS. 1 to 3B) is included with base member 10.

The handle member 20 includes a pair of arm members 132 joined together by a support plate 134 near a distal end 130*a* of handle member 20. The arms 132 include bolt holes 136 near a proximate end 130*b* of handle member 20, through which first bolt 120 extends so that the proximate ends 10*b*/130*b* of base and handle members 10/20 are rotatably connected to each other about first bolt 120. Slots 138 are formed in arms 132 adjacent handle member distal end 130*a*. A latch plate 140 includes engagement tabs 142 that slidably extend out through slots 138. A spring member 144 engaged between slots 138 and latch plate 140 biases plate 140 toward the handle member distal end 130*a*. A second bolt (or other rigid cross member) 146 is connected between arms 132 at a position between first bolt 120 and handle member distal end 130*a*. A hollow sleeve 148 is disposed around, and freely rotates about, second bolt 146 (i.e. the inner diameter of sleeve 148 is greater than the outer diameter of the second bolt 146).

The handle member 20 rotates relative to base member 10 between an open (unfolded) position and a closed (folded) position. FIG. 10A illustrates the handle member open position, where the distal ends 110*a*/130*a* are extended away from each other. FIGS. 10B and 10C illustrate the handle member closed position, where the handle member 20 rotates about first bolt 120 and distal ends 110*a*/130*a* fold toward each other, until engagement tabs 142 snap into and engage with hooks 118 to secure handle member 20 in the closed position. To open the tensioning device back to its open position, the latch plate 140 is urged back against the resilient force of spring 144 until tabs 142 clear hooks 118, where the handle member 20 can then be rotated to the open position of FIG. 10A.

FIGS. 11A and 11B illustrate the strap paths for the tensioning device in both the open and closed positions. Specifically, the second tension strap 58 has its first end terminating in a loop 152 that is connected to tension indicator device 40, and a second end that terminates in a second loop 154 connected around hook member 60.

First tension strap 56 has a first end 160 that is free and preferably (but not necessarily) terminates in a loop that is not connected to anything, and a second (load) end terminating in a loop 162 that is connected around a hook member 60. The first tension strap 56 is positioned in the tensioning device 1 as follows. With the tensioning device 1 in its open position, the free end 160 of strap 56 enters the tensioning device from the distal end 110a through the first strap opening 122 and back up through the second strap opening 122 (i.e. around beam 124), and is fed underneath bolt 120, underneath and around hollow sleeve 148, back underneath bolt 120, and out of distal end 110a of tension device 1, as shown in FIG. 11A. In this position, the strap passes virtually unhindered past bolt 120 and is looped around hollow sleeve 148, with the sleeve 148 separating strap 56 into a free segment 158a (extending out of the tensioning device and terminating in free end 160) and a load segment 158b (extending out of the tensioning device and terminating in the load end 162). Sleeve 148 rotates freely about bolt 146 (e.g. one or both elements are formed of low friction materials, and may be lubricated), which allows the strap 56 (and sleeve 148) to move around second bolt 146 very easily. Thus, the strap 56 can be pulled through the tensioning device in this open position with minimum resistance by pulling on either the free end 160 or load end 162. Beam 124 helps keep the load segment of the strap properly referenced with respect to sleeve 148.

FIG. 11B illustrates the path of strap 56 when the tension device 1 is moved to its closed position. By moving the tension device to this closed position, bolt/sleeve 146/148 are rotated around to the other side of bolt 120 (i.e. toward distal end 110a), thereby wrapping both the free segment 158a and load segment 158b of the strap 56 around first bolt 120, with strap free segment 158a disposed between first bolt 120 and load segment 158b. In this configuration, the strap 56 can only move in a single direction. When the free segment of the strap is pulled, there is relatively low resistance with strap 56 offered by the first bolt 120, and very low resistance offered by the sleeve 148 (freely rotating about second bolt 146). As long as the load segment 158b of strap 56 is not under tension, there is also very little friction between the free and load segments of the strap wrapped around first bolt 120 because these strap segments are not being pressed together. This allows the user to cinch the strap tight to a desired tension (as indicated by tension indicator device 40) by pulling on the free end 160, even though the tension device is closed.

However, when the load segment of strap 56 is tensioned (e.g. pulled by forces from the load on the load end 162), the load segment 158b of the strap rounding first bolt 120 bears down against the free segment 158a of the strap rounding first bolt 120. In order for the strap to move toward the load end 162, the load and free segments of strap 56 rounding first bolt 120 (which are pressed together by the pulling force of the strap) would have to move in opposite directions. The high friction between these strap segments prevents such movement. The greater the pull force at the load end, the greater the force that presses these strap segments together (i.e. increasing the friction therebetween), thus preventing the strap from moving toward the load end. Should the load segment of the strap ever slacken, the user can cinch the strap tighter by pulling on the strap's free end without having to release the tensioning device from its close position, while utilizing tension indicator device 40 to ensure the desired tension is applied to, and/or is maintained on, straps 56/58.

It should be noted that in the above described embodiments, strap 58 and optional hook 60 form an anchor 66 for base member 10, for securing base member 10 to an anchor point as tension on strap 56 is created and/or maintained. However, anchor 66 need not include strap 58. Instead, hook member 60 or other member affixable to the anchor point could be connected to the load member 46 without the aid of a strap. In the case of a tensioning device where strap 58 extends out both ends of base member 10 (e.g. similar to the device in U.S. Pat. No. 6,195,848), the anchor 66 is that portion of the single strap 58 extending out one end of the base member 10. In the case of tension indicator device 40 configured to engage with strap 58 instead of anchor 66, then anchor 66 could be directly connected to based member 10.

It is to be understood that the present invention is not limited to the embodiment(s) described above and illustrated herein, but encompasses any and all variations falling within the scope of the appended claims. For example, the tension indicator device of the present invention can be implemented in the base member of any tensioning device that includes a sliding or rotating handle, clamp, gripping member, etc. for securing a strap to the base member to selectively prevent reverse direction movement of the strap (relative to the base member) that would prematurely release the strap tension. Examples of such devices includes those in U.S. Pat. Nos. 2,998,629, 4,456,628, and 4,951,365, which are incorporated herein by reference. The translating or rotating load members are shown and described as pins, yet the load member can be any rigid member that moves translationally and/or rotationally in a proportionate manner to changes in the strap tension. Further, the load member could be pulled away from the reference surface to which the spring is attached, thus pulling against resilient force of the spring as strap tension increases. While strap 58 is shown to push/pull on the load member via direct contact therewith, the load member could be configured to make direct or indirect contact with either straps 56/58, to indicate strap tension. Lastly, the anchor point to which strap 58 is connected could be the end of strap 56 (e.g. by hooking hooks 60 in FIG. 1 together).

What is claimed is:

1. A tensioning device for anchoring a load to an anchor point, comprising:
   a strap;
   a base member;
   a mechanism for securing the strap to the base member under a tension;
   an anchor for anchoring the base member to the anchor point; and
   the base member includes a tension indicating device having a load member that moves in response to changes in the tension;
   wherein the base member includes a pair of arms, the load member is rotationally connected to the arms, and the movement of the load member includes the load member rotating relative to the arms as the tension changes.

2. The tensioning device of claim 1, further comprising: a spring connected to the load member, wherein at least one of the anchor and the strap is configured to exert a changing force on the load member so that the load member moves against a resilient force of the spring as the tension changes.

3. The tensioning device of claim 2, wherein the anchor is connected to, and exerts the force on, the load member.

4. The tensioning device of claim 3, wherein the anchor is a second strap.

5. The tensioning device of claim 4, wherein a hook member is attached to an end of the second strap.

6. The tensioning device of claim 1, wherein the movement of the load member includes torsional flexing of one end of the load member.

7. The tensioning device of claim 1, wherein the movement of the load member is proportional to magnitude changes of the tension, and wherein a position of the load member relative to the base member provides a visual indication of a magnitude of the tension.

8. The tensioning device of claim 7, wherein the base member includes indicia for measuring the movement of the load member.

9. The tensioning device of claim 1, wherein the anchor and the strap are integrally formed together as a single strap passing through the base member.

10. The tensioning device of claim 1, further comprising:
a handle member rotatably mounted to the base member and configured to operate the mechanism via rotation of the handle to secure the strap to the base member under the tension by securing a position of the strap relative to the base member or by moving the strap relative to the base member to increase the tension on the strap.

11. The tensioning device of claim 10, wherein the mechanism includes:
a reel member rotatably mounted to the base member and having a slot for receiving the strap;
a pair of ratchet wheels each mounted on the reel member;
a locking plate slidingly mounted to the base member for engaging the ratchet wheels to selectively prevent rotation of the reel member in a first direction; and
a pawl slidingly mounted to the handle for engaging the ratchet wheels to rotate the reel member in a second direction opposite the first direction as the handle is rotated for increasing the tension on the strap.

12. The tensioning device of claim 10, wherein the mechanism comprises:
a bolt rotatably connecting the handle to the base member;
a cross member connected to the handle that rotates around the bolt as the handle rotates between open and closed positions relative to the base member; and
the strap is connected to the cross member and looped around the bolt such that the strap is secured to the base member as the handle is rotated to the closed position.

13. The tensioning device of claim 10, wherein the handle grips and holds the strap in a fixed position relative to the base member as the handle is rotated into a closed position relative to the base member.

14. The tensioning device of claim 1, wherein the base member comprises:
a pair of arms;
a reference member fixedly coupled to the pair of arms; and
a spring coupled between the reference member and the load member, wherein the anchor is coupled to the load member.

15. The tensioning device of claim 14, wherein:
the anchor comprises a second strap at least partially enveloping the load member.

16. A tensioning device for anchoring a load to an anchor point, comprising:
a strap;
a base member having a pair of arms;
a handle rotatably connected to the base member;
a mechanism operated by rotation of the handle for securing the strap to the base member under a tension;
an anchor for anchoring the base member to the anchor point; and
a tension indicating device connected to the base member, the tension indicating device comprising:
a load member extending between the arms, said load member being rotationally connected to the arms, and
a spring connected between the load member and the base member;
wherein at least one of the anchor and the strap are configured to exert a changing force on the load member for moving the load member against a resilient force of the spring as the tension changes, wherein the movement of the load member includes the load member rotating relative to the arms as the tension changes.

17. The tensioning device of claim 16, wherein the base member further includes a reference member extending between the arms, and wherein the spring is connected between the load member and the reference member.

18. The tensioning device of claim 16, wherein the base member comprises:
a reference member fixedly coupled to the pair of arms; and
a spring coupled between the reference member and the load member, wherein the anchor is coupled to the load member.

19. The tensioning device of claim 18, wherein:
the anchor comprises a second strap at least partially enveloping the load member.

20. The tensioning device of claim 16, wherein the anchor is connected to, and exerts the force on, the load member.

21. The tensioning device of claim 20, wherein the anchor is a second strap.

22. The tensioning device of claim 21, wherein a hook member is attached to an end of the second strap.

23. The tensioning device of claim 16, wherein the movement of the load member is proportional to magnitude changes of the tension, and wherein a position of the load member relative to the base member provides a visual indication of a magnitude of the tension.

24. The tensioning device of claim 23, wherein the base member includes indicia for measuring the movement of the load member.

25. The tensioning device of claim 16, wherein the anchor and the strap are integrally formed together as a single strap passing through the base member.

26. The tensioning device of claim 16, wherein the mechanism secures the strap to the base member under the tension by securing a position of the strap relative to the base member or by moving the strap relative to the base member to increase the tension on the strap.

27. The tensioning device of claim 26, wherein the mechanism includes:
a reel member rotatably mounted to the base member and having a slot for receiving the strap;
a pair of ratchet wheels each mounted on the reel member;
a locking plate slidingly mounted to the base member for engaging the ratchet wheels to selectively prevent rotation of the reel member in a first direction; and a pawl slidingly mounted to the handle for engaging the ratchet wheels to rotate the reel member in a second direction opposite the first direction as the handle is rotated for increasing the tension on the strap.

28. The tensioning device of claim 26, wherein the mechanism comprises:
   a bolt rotatably connecting the handle to the base member;
   a cross member connected to the handle that rotates around the bolt as the handle rotates between open and closed positions relative to the base member; and
   the strap is connected to the cross member and looped around the bolt such that the strap is secured to the base member as the handle is rotated to the closed position.

29. The tensioning device of claim 26, wherein the handle grips and holds the strap in a fixed position relative to the base member as the handle is rotated into a closed position relative to the base member.

30. A tensioning device for anchoring a load to an anchor point, comprising:
   a strap;
   a base member;
   a mechanism for securing the strap to the base member under a tension;
   an anchor for anchoring the base member to the anchor point; and
   the base member includes a tension indicating device having a load member that moves in response to changes in the tension;
   wherein the anchor comprises a second strap at least partially enveloping the load member.

31. The tensioning device of claim 30, further comprising:
   a spring connected to the load member, wherein at least one of the anchor and the strap is configured to exert a changing force on the load member so that the load member moves against a resilient force of the spring as the tension changes.

32. The tensioning device of claim 30, wherein:
   the base member includes a pair of arms each having a slot;
   the load member includes portions that are slidingly disposed in the slots; and
   the movement of the load member includes the load member portions moving along the slots as the tension changes.

33. The tensioning device of claim 31, wherein:
   the base member includes a pair of arms;
   the load member is rotationally connected to the arms; and
   the movement of the load member includes the load member rotating relative to the arms as the tension changes.

34. The tensioning device of claim 31, wherein the anchor is connected to, and exerts the force on, the load member.

35. The tensioning device of claim 34, wherein the anchor is a second strap.

36. The tensioning device of claim 35, wherein a hook member is attached to an end of the second strap.

37. The tensioning device of claim 30, wherein the movement of the load member includes torsional flexing of one end of the load member.

38. The tensioning device of claim 30, wherein the movement of the load member is proportional to magnitude changes of the tension, and wherein a position of the load member relative to the base member provides a visual indication of a magnitude of the tension.

39. The tensioning device of claim 38, wherein the base member includes indicia for measuring the movement of the load member.

40. The tensioning device of claim 30, wherein the anchor and the strap are integrally formed together as a single strap passing through the base member.

41. The tensioning device of claim 30, further comprising:
   a handle member rotatably mounted to the base member and configured to operate the mechanism via rotation of the handle to secure the strap to the base member under the tension by securing a position of the strap relative to the base member or by moving the strap relative to the base member to increase the tension on the strap.

42. The tensioning device of claim 41, wherein the mechanism includes:
   a reel member rotatably mounted to the base member and having a slot for receiving the strap;
   a pair of ratchet wheels each mounted on the reel member;
   a locking plate slidingly mounted to the base member for engaging the ratchet wheels to selectively prevent rotation of the reel member in a first direction; and
   a pawl slidingly mounted to the handle for engaging the ratchet wheels to rotate the reel member in a second direction opposite the first direction as the handle is rotated for increasing the tension on the strap.

43. The tensioning device of claim 41, wherein the mechanism comprises:
   a bolt rotatably connecting the handle to the base member;
   a cross member connected to the handle that rotates around the bolt as the handle rotates between open and closed positions relative to the base member; and
   the strap is connected to the cross member and looped around the bolt such that the strap is secured to the base member as the handle is rotated to the closed position.

44. The tensioning device of claim 41, wherein the handle grips and holds the strap in a fixed position relative to the base member as the handle is rotated into a closed position relative to the base member.

45. The tensioning device of claim 30, wherein the base member comprises:
   a pair of arms;
   a reference member fixedly coupled to the pair of arms; and
   a spring coupled between the reference member and the load member, wherein the anchor is coupled to the load member.

46. The tensioning device of claim 45, wherein:
   each of the pair of arms has a slot; and
   the load member includes portions that are slidingly disposed in the slots.

47. A tensioning device for anchoring a load to an anchor point, comprising:
   a strap;
   a base member having a pair of arms;
   a handle rotatably connected to the base member;
   a mechanism operated by rotation of the handle for securing the strap to the base member under a tension;
   an anchor for anchoring the base member to the anchor point; and
   a tension indicating device connected to the base member, the tension indicating device comprising:
      a load member extending between the arms, and
      a spring connected between the load member and the base member;
   wherein at least one of the anchor and the strap are configured to exert a changing force on the load member for moving the load member against a resilient force of the spring as the tension changes, and the anchor comprises a second strap at least partially enveloping the load member.

48. The tensioning device of claim 47, wherein the base member further includes a reference member extending between the arms, and wherein the spring is connected between the load member and the reference member.

49. The tensioning device of claim 47, wherein:
the each of the arms includes a slot;
the load member includes portions that are slidingly disposed in the slots; and
the movement of the load member includes the load member portions moving along the slots as the tension changes.

50. The tensioning device of claim 47, wherein the anchor is connected to, and exerts the force on, the load member.

51. The tensioning device of claim 50, wherein the anchor is a second strap.

52. The tensioning device of claim 51, wherein a hook member is attached to an end of the second strap.

53. The tensioning device of claim 47, wherein the movement of the load member is proportional to magnitude changes of the tension, and wherein a position of the load member relative to the base member provides a visual indication of a magnitude of the tension.

54. The tensioning device of claim 53, wherein the base member includes indicia for measuring the movement of the load member.

55. The tensioning device of claim 47, wherein the second strap and the strap are integrally formed together as a single strap passing through the base member.

56. The tensioning device of claim 47, wherein the mechanism secures the strap to the base member under the tension by securing a position of the strap relative to the base member or by moving the strap relative to the base member to increase the tension on the strap.

57. The tensioning device of claim 56, wherein the mechanism includes:

a reel member rotatably mounted to the base member and having a slot for receiving the strap;
a pair of ratchet wheels each mounted on the reel member;
a locking plate slidingly mounted to the base member for engaging the ratchet wheels to selectively prevent rotation of the reel member in a first direction; and
a pawl slidingly mounted to the handle for engaging the ratchet wheels to rotate the reel member in a second direction opposite the first direction as the handle is rotated for increasing the tension on the strap.

58. The tensioning device of claim 56, wherein the mechanism comprises:
a bolt rotatably connecting the handle to the base member;
a cross member connected to the handle that rotates around the bolt as the handle rotates between open and closed positions relative to the base member; and
the strap is connected to the cross member and looped around the bolt such that the strap is secured to the base member as the handle is rotated to the closed position.

59. The tensioning device of claim 56, wherein the handle grips and holds the strap in a fixed position relative to the base member as the handle is rotated into a closed position relative to the base member.

60. The tensioning device of claim 47, wherein the base member comprises:
a reference member fixedly coupled to the pair of arms; and
a spring coupled between the reference member and the load member, wherein the anchor is coupled to the load member.

61. The tensioning device of claim 60, wherein:
each of the pair of arms has a slot; and
the load member includes portions that are slidingly disposed in the slots.

* * * * *